United States Patent
Fujimoto et al.

[11] Patent Number: 5,962,616
[45] Date of Patent: Oct. 5, 1999

[54] ANAEROBIC HARDENING COMPOSITION

[75] Inventors: Tetsuo Fujimoto; Masahiro Terada; Isao Endo, all of Ohta, Japan

[73] Assignee: General Electric Company, Pittsfield, Mass.

[21] Appl. No.: 08/942,733

[22] Filed: Oct. 2, 1997

Related U.S. Application Data

[63] Continuation of application No. 07/699,070, May 13, 1991, abandoned.

[30] Foreign Application Priority Data

Jul. 17, 1990 [JP] Japan .................................. 2-187218

[51] Int. Cl.⁶ .................................................. C08G 77/06
[52] U.S. Cl. .............................. 528/24; 528/21; 528/28; 528/41; 526/279; 526/220; 526/217; 525/474
[58] Field of Search .................................. 528/24, 21, 28, 528/41; 526/279, 220, 217; 525/474

[56] References Cited

U.S. PATENT DOCUMENTS

| | | | |
|---|---|---|---|
| 4,035,355 | 7/1977 | Baney et al. | 260/46.5 |
| 4,201,848 | 5/1980 | Kotrani et al. | 526/220 |
| 4,215,209 | 7/1980 | Ray-Chaudhuri et al. | 526/279 |
| 4,235,986 | 11/1980 | Catena | 526/279 |
| 4,898,899 | 2/1990 | Isobe | 524/90 |

*Primary Examiner*—Melvyn I. Marquis

[57] ABSTRACT

Disclosed is an anaerobic hardening composition comprising (A) 100 parts by weight of a (meth)acryloyloxy group-containing polyorganosiloxane, (B) from 0.01 to 20 parts by weight of a dialkyl peroxide and (C) from 0.1 to 20 parts by weight of an amine. The composition hardens in the absence of oxygen with excellent hardenability and adhesiveness-revealing speed to give a hardened product having a high adhesion power.

12 Claims, No Drawings

ANAEROBIC HARDENING COMPOSITION

This is a continuation of application(s). Ser. No. 07/699,070 filed on May 13,1991, now abandoned.

The present application claims the priority of Japanese Patent Application Serial No. 2-187218 filed on Jul. 17, 1990.

FIELD OF THE INVENTION

The present invention relates to an anaerobic hardening composition, which comprises a poly-organosiloxane composition which hardens in the absence of oxygen, and in particular to an anaerobic hardening adhesive which hardens rapidly in the absence of oxygen to directly show the adhesive capacity and which is therefore useful for sealing of pipes.

BACKGROUND OF THE INVENTION

An anaerobic hardening composition is one which does not harden and is generally stable for a long period of time when in contact with air or oxygen, but which is polymerized to harden in the absence of air or oxygen, for example, when situated between two adjacent faces from which air or oxygen has been shielded. The composition is used for adhesion, sealing or fixation of metal parts and the like.

Anaerobic hardening compositions comprising a monomer component consisting essentially of an acrylate monomer and/or a methacrylate monomer and an organic peroxide as a polymerization initiator are known. However the known anaerobic hardening composition has a drawback in that the adhesion power of the hardened product noticeably lowers under a high temperature condition. Specifically, after the composition has been anaerobically polymerized and hardened in use for adhesion, sealing and fixation, the adhesive power of the hardened product noticeably lowers when the product is under a high temperature condition.

On the other hand, silicone products made from polyorganosiloxanes are used in various fields since they have excellent heat resistance, cold resistance and chemical resistance. It is extremely difficult to impart a so-called anaerobic hardening property to such polyorganosiloxanes. Hitherto, there is known a composition comprising an acryl and/or methacryl group-containing polyorganosiloxane and a hydroperoxide as a polymerization initiator (refer to Japanese Patent Application Laid-Open No. 53-142493) and a composition consisting essentially of a linear polyorganosiloxane which has (an) acryloyl and/or methacryloyl group(s) and a hydrolyzable group at both ends of the molecular chain (refer to Japanese Patent Application Laid-Open No. 1-287115). However, these compositions have a serious problem in that their hardening speed and adhesiveness-revealing speed are extremely low.

SUMMARY OF THE INVENTION

The object of the present invention is to overcome the above-mentioned problems in the prior art and to provide an anaerobic hardening polyorganosiloxane composition, which has high hardening speed and adhesiveness-revealing speed and which provides a hardened product having excellent heat resistance.

Specifically, the present invention is an anaerobic hardening composition comprising:

(A)100 parts by weight of a polyorganosiloxane composed of a siloxane unit of the general formula (I):

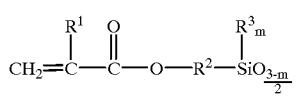

where $R^1$ represents a hydrogen atom or a methyl group;
$R^2$ represents an alkylene group having from 1 to 4 carbon atoms;
$R^3$ each represents a substituted or unsubstituted monovalent hydrocarbon group which contains no aliphatic unsaturated bonds; and
m represents 0, 1 or 2; and
a siloxane unit of the general formula (II):

where $R^4$ each represents a substituted or unsubstituted monovalent hydrocarbon group which contains no aliphatic unsaturated bonds; and n represents 0, 1, 2 or 3;

(B)from 0.01 to 20 parts by weight of a dialkyl peroxide; and (C)from 0.1 to 20 parts by weight of an amine.

DETAILED DESCRIPTION OF THE INVENTION

The polyorganosiloxane of component (A) in the present invention comprises substantially only the siloxane unit of the following formula (I):

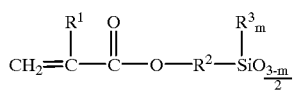

or it comprises a combination of the siloxane unit of the above formula (I) and the siloxane unit of the following formula (II):

In formula (I), $R^1$ is either methyl or hydrogen. Preferably, $R^1$ is methyl. In these formulae, $R^2$ is typically —CH$_2$—, —CH$_2$CH$_2$—, —CH$_2$CH$_2$CH$_2$—, —CH$_2$CH(CH$_3$)—, —CH$_2$CH$_2$CH$_2$CH$_2$—, —CH$_2$CH$_2$CH(CH$_3$)— or —CH$_2$CH(CH$_2$CH$_3$)—. It is preferably —CH$_2$CH$_2$CH$_2$— because of the easy producibility and the high stability against hydrolysis. $R^3$ and $R^4$ each are a monovalent hydrocarbon group which contains no aliphatic unsaturated bonds. For example, there are mentioned alkyl groups such as methyl, ethyl or propyl groups; aryl groups such as phenyl groups; aralkyl groups such as β-phenylethyl or β-phenylpropyl groups; and substituted hydrocarbon groups such as chloromethyl or 3,3,3-trifluoropropyl groups. Above all, $R^3$ is preferably methyl group, phenyl group or 3,3,3-trifluoropropyl group, and most preferably, methyl or phenyl, as the polyorganosiloxane (A) of the case has excellent heat resistance and oil resistance. $R^4$ is preferably a methyl group or a phenyl group.

Especially preferred siloxane units in the polyorganosiloxane (A) include, for example, $QSiO_{3/2}$, $Q(CH_3)SiO$, $Q(CH_3)_2SiO_{1/2}$, $Q(C_6H_5)SiO$ and $Q(CF_3CH_2CH_2)SiO$ as the above formula (I) where Q means an acryloyloxyalkyl or methacryloyloxyalkyl group in (I); and as the above formula (II), there are mentioned, for example, $SiO_2$, $CH_3SiO_{3/2}$, $(CH_3)_2SiO$, $(CH_3)_3SiO_{1/2}$, $C_6H_5SiO_{3/2}$, $CH_3(C_6H_5)SiO$, $C_6H_5)_2SiO$ and $CH_3(CF_3CH_2CH_2)SiO$. The polyorganosiloxane (A) may comprise such units singly or in combination of two or more of them.

In the polyorganosiloxane (A), the proportion of the siloxane units of the formula (I) to the total siloxane units is preferably from 30 to 100 mol %, especially preferably from 40 to 60 mol %, in view of the hardenability of the composition of the invention and of the characteristics of the hardened product from the composition.

The polyorganosiloxane (A) may vary from being a low viscous liquid having a low molecular weight to being a solid resin which has a high molecular weight and which is soluble in an organic solvent. Preferably, it is in the form of a liquid.

The polyorganosiloxane (A) may be prepared by any method which is suitable for preparation of polyorganosiloxanes having (meth)acryloyloxy group-containing siloxane units. Precisely, there are mentioned, for example, a method in which (meth)acryloyloxy group-containing silanes and/or siloxanes and optionally (meth)acryloyloxy group-free silanes and/or siloxanes are hydrolyzed and condensed or equilibrated, and a method in which a polyorganosiloxane having hydrogen atom(s) as bonded to a silicon atom is first prepared and thereafter reacted with an ester of acrylic acid and/or methacrylic acid and an unsaturated alcohol in the presence of a platinum catalyst.

Regarding the function of the dialkyl peroxide (B) to be used in the present invention, where it is combined with the polyorganosiloxane (A), the anaerobic hardening speed of the composition of the present invention is extremely accelerated. Additionally, further combination of the component (C) with the components (A) and (B) much accelerates the adhesiveness revealing speed of the hardened product from the composition.

As examples of component (B), there are mentioned dicumyl peroxide, 2,5-dimethyl-2,5-di(t-butylperoxy) hexane, di-t-butyl peroxide and t-butylcumyl peroxide. The amount of component (B) in the composition is from 0.01 to 20 parts by weight, preferably from 0.05 to 10 parts by weight, per 100 parts by weight of the component (A). If it is less than 0.1 part by weight, the object of the present invention could not be attained. On the contrary, if it is more than 20 parts by weight, any further improvement of the effect of the present invention could not be expected.

The component (C) in the composition of the present invention is essential for the purpose of enhancing the hardening capacity and adhesiveness expressing capacity of the composition, in combination with the component (B). As examples of component (C), there are mentioned amines such as diethylamine, triethylamine, triethyelenediamine, N,N-dimethylparatoluidine, and N,N, N',N'-tetramethylpropylenediamine. Component (C) may also be orthobenzene-sulfimide. The amount of component (C) in the composition of the present invention is from 0.1 to 20 parts by weight, preferably from 0.5 to 10 parts by weight, per 100 parts by weight of the component (A). If it is less than 0.1 part by weight, the object of the present invention could not be obtained. However, even though it is more than 20 parts by weight, any further improvement of the effect of the present invention could not be expected.

The composition of the present invention may optionally contain other various additives than the above components (A) to (C), if desired. Precisely, it may contain a radical absorbent such as benzoquinone or hydroquinone for the purpose of improving the storage stability of the composition, a silane coupling agent such as γ-methacryloylpropyltrimethoxysilane, γ-glycidoxypropyltrimethoxysilane or N-(β-aminoethyl)-γ-aminopropyltrimethoxysilane for the purpose of improving the adhesive power of the hardened product, and a filler such as quartz powder or fumed silica. Additionally, it may also contain a dye as well as a diluting agent such as a silicone oil or organic solvent.

For preparing the composition of the present invention, it is desired that the components are blended in the presence of a dry oxygen gas stream. For storing the composition, it is desired to protect the composition from direct contact with metals. Preferably, the composition is stored in a plastic container made from polyethylene, polypropylene or the like.

The composition of the present invention rapidly anaerobically hardens in the space between the adjacent two faces which are not in contact with air, whereupon the adhesiveness revealing speed of the hardened product is high and the hardened product has an excellent heat resistance. Because of such favorable characteristics, the composition of the present invention is useful as an adhesive for adhesion and fixation of screws and flange faces and also as a sealant for pipe lines.

Next, the present invention will be explained in more detail by way of the following examples, which, however, are not intended to restrict the scope of the present invention.

Unless otherwise specifically indicated, all parts are by weight and the physical values such as viscosity are measured at 25° C., in the following examples.

SYNTHESIS EXAMPLE 1

To a mixture comprising 324.8 g (2 mol) of $(CH_3)_3SiOSi(CH_3)_3$, 198.3 g (1 mol) of $C_6H_5Si(OCH_3)_3$ and 1242.0 g (5 mol) of $CH_2=C(CH_3)-COOC_3H_6-Si(OCH_3)_3$, were added 356.4 g (19.8 mol) of water, the amount of water being 110% of the theoretical amount necessary for hydrolyzing all the methoxy groups bonded to the silicon atoms in the mixture, and a catalytic amount of $CF_3SO_3H$. 1270 g of toluene was added to the resulting mixture, which was then heated under reflux for completing hydrolysis and equilibration of the silicon compounds. Thereafter water and methanol were removed from the reaction mixture by azeotropic distillation.

A sufficient amount of $CaCO_3$ was added to the reaction product and the $CF_3SO_3H$ catalyst was neutralized. Then the insoluble substances were removed by filtration, and the resulting filtrate was distilled to remove toluene and other volatile components therefrom.

The thus obtained non-volatile methacryloyloxy group-containing polyorganosiloxane was analyzed by $H^1$-NMR. As a result, it was identified to be a copolymer (Sample I) substantially comprising 36 mol% of $(CH_3)_3SiO_{1/2}$ unit, 12 mol % of $C_6H_5-SiO_{3/2}$ unit and 52 mol % of $CH_2=C(CH_3)-COOC_3H_6-SiO_{3/2}$ unit.

SYNTHESIS EXAMPLE 2

A mixture comprising 434.8 g (4 mol) of $(CH_3)_3SiCl$, 298.0 g (2 mol) of $CH_3SiCl_3$ and 1238.8 g (4 mol) of $CH_2=C(CH_3)-COOC_3H_6-SiCl_3$ was dissolved in 1180 g of toluene, and 3960 g (220 mol) of water was added thereto and blended, the amount of water added being 10 times of the theoretical amount necessary for hydrolyzing all chlorine atoms as bonded to silicon atoms in the mixture. After blending, the aqueous layer was separated off, and the toluene layer was washed with water several times and then dried with anhydrous sodium sulfate. This was filtered, and the resulting filtrate was distilled so as to remove toluene and other volatile components.

The thus obtained non-volatile methacryloyloxy group-containing polyorganosiloxane was analyzed by $H^1$-NMR. As a result, it was identified to be a copolymer (Sample II) substantially comprising 34 mol % of $(CH_3)_3SiO_{1/2}$ unit, 22 mol % of $CH_3-SiO_{3/2}$ unit and 44 mol % of $CH_2=C(CH_3)-COOC_3H_6-SiO_{3/2}$ unit.

SYNTHESIS EXAMPLE 3

To a mixture comprising 126.2 (1 mol) of $CH_2=C(CH_3)-COOCH_2-CH=CH_2$ and 134.3 g (1 mol) of $(CH_3)_2HSi(OC_2H_5)$, was added chloroplatinic acid in an amount of 10 ppm as Pt to the total amount of the mixture. Accordingly,

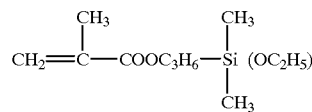

was prepared by hydrosilylation reaction. Water was added to the product for hydrolysis to prepare Sample (III), which is represented by the following structural formula:

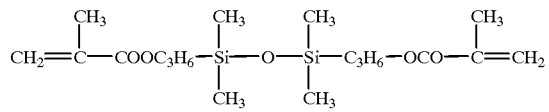

EXAMPLE 1

To 100 parts of Sample (I) were added 0.5 part of dicumyl peroxide, 2 parts of diethylamine and 0.5 part of orthobenzenesulfimide, and the whole was admixed to prepare a composition. The adhesion power of the composition was measured and the result is shown in Table 1 below. Measurement of the adhesion power was effected by the tensile shear adhesion power test mentioned below.

Tensile Shear Adhesion Power Test

A sample to be tested was coated on an iron plate of 1×25×100 mm. The coated iron plate was attached to another with the overlapped part being 25×25 mm, and the attached plates were pressed under pressure of 10 kgf/cm². These were left under the condition of 25° C. and 60% RH (relative humidity) for 2 hours, 6 hours, 12 hours and 24 hours. The sample as left under the condition of 25° C. and 60% RH for 24 hours was then stored at 200° C. for another 500 hours. The adhesion power of each sample was measured with a tensile strength tester at a peeling rate of 10 mm/min.

COMPARATIVE EXAMPLE 1

To 100 parts of Sample (I) were added 0.5 part of cumene hydroperoxide, 2 parts of diethylamine and 0.5 part of orthobenzenesulfimide, and the whole was admixed to prepare a composition. Using the composition, the adhesion power was measured in the same manner as in Example 1, and the results obtained are shown in Table 1 below.

EXAMPLE 2

To 100 parts of Sample (II) were added 3 parts of 2,5-dimethyl-2,5-di(t-butylperoxy)hexane, 5 parts of N,N-dimethylparatoluidine and 2 parts of ortho-benzenesulfimide, and the whole was admixed to prepare a composition. Using the composition, the adhesion power was measured in the same manner as in Example 1, and the results obtained are shown in Table 1 below.

COMPARATIVE EXAMPLE 2

To 100 parts of Sample (II) were added 3 parts of t-butyl hydroperoxide, 5 parts of N,N-dimethylparatoluidine and 2 parts of orthobenzenesulfimide, and the whole was admixed to prepare a composition. Using the composition, the adhesion power was measured in the same manner as in Example 1, and the results obtained are shown in Table 1 below.

EXAMPLE 3

To 100 parts of Sample (III) were added 5 parts of di-t-butyl peroxide, 10 parts of triethylamine, 20 parts of Aerosil 200 (fumed silica, product by Nippon Aerosil Co.) and 0.1 part of 1,4-benzoquinone, and the whole was admixed to prepare a composition. Using the composition, the adhesion power was measured in the same manner as in Example 1, and the results obtained are shown in Table 1 below.

COMPARATIVE EXAMPLE 3

To 100 parts of triethylene glycol dimethacrylate were added 5 parts of di-t-butyl peroxide, 10 parts of triethylamine, 20 parts of Aerosil 200 and 0.1 part of 1,4-benzoquinone, and the whole was admixed to prepare a composition. Using the composition, the adhesion power was measured in the same manner as in Example 1, and the results obtained are shown in Table 1 below.

TABLE 1

| | | Example | | | Comparative Example | | |
| --- | --- | --- | --- | --- | --- | --- | --- |
| | | 1 | 2 | 3 | 1 | 2 | 3 |
| Components (parts) | Polyorganosiloxane | Sample I 100 | Sample II 100 | Sample III 100 | Sample I 100 | Sample II 100 | — |
| | Acrylate | — | — | — | — | — | Triethylene Glycol Dimethacrylate 100 |
| | Peroxide | Dicumyl | 2,5-Dimethyl- | Di-t-butyl | Cumene | T-butyl | Di-t-butyl |

TABLE 1-continued

|  |  |  | Example | | | Comparative Example | | |
| --- | --- | --- | --- | --- | --- | --- | --- | --- |
|  |  |  | 1 | 2 | 3 | 1 | 2 | 3 |
|  |  |  | Peroxide 0.5 | 2,5-di(t-butyl-peroxy)hexane 3 | Peroxide 5 | Hydroperoxide 0.5 | Hydroperoxide 3 | Peroxide 5 |
|  | Amine |  | Diethylamine 2 Orthobenzene-sulfimide 0.5 | N,N-dimethyl-paratoluidine 5 Orthobenzene-sulfimide 0.5 | Triethylamine 10 | Diethylamine 2 Orthobenzene-sulfimide 50 | N,N-dimethyl-paratoluidine 5 Orthobenzene-sulfimide 0.5 | Triethylamine 10 |
|  | Filler |  | — | — | Aerosil 200 20 |  |  | Aerosil 200 20 |
|  | Storage Stabilizer |  | — | — | 1,4-Benzo-quinone 0.1 | — | — | 1,4-Benzo-quinone 0.1 |
| Adhesion Power (kgf/cm²) | 25° C., 60% RH, | 2 hrs | 58 | 62 | 43 | Not hardened | Not hardened | Not hardened |
|  |  | 6 hrs | 83 | 88 | 62 | 3 | 3 | 15 |
|  |  | 12 hrs | 92 | 90 | 78 | 21 | 19 | 38 |
|  |  | 24 hrs | 4 | 92 | 81 | 42 | 34 | 59 |
|  | 25° C., 60% RH, 2 hrs, then 200° C., 500 hrs |  | 83 | 82 | 78 | 39 | 31 | 0 (deteriorated) |

What is claimed is:

1. An anaerobic hardening composition comprising:
(A) 100 parts by weight of a polyorganosiloxane composed of a siloxane unit of a general formula (I):

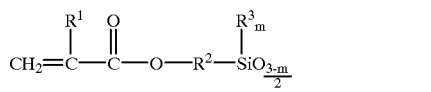

where $R^1$ represents a hydrogen atom or a methyl group;
$R^2$ represents an alkylene group having from 1 to 4 carbon atoms;
$R^3$ each represents a substituted or unsubstituted monovalent hydrocarbon group which contains no aliphatic unsaturated bonds; and
m represents 0, 1 or 2; and
a siloxane unit of the general formula (II):

where $R^4$ each represents a substituted or unsubstituted monovalent hydrocarbon group which contains no aliphatic unsaturated bonds; and n represents 0, 1, 2 or 3;
(B) from 0.01 to 20 parts by weight of a dialkyl peroxide; and
(C) from 0.1 to 20 parts by weight of an amine.

2. The composition of claim 1, in which $R^2$ is —$CH_2CH_2CH_2$—.
3. The composition of claim 1, in which $R^1$ is a methyl group.
4. The composition of claim 1, in which $R^4$ is a methyl group or a phenyl group.
5. The composition of claim 1, in which the amount of the component (B) is from 0.05 to 10 parts by weight per 100 parts by weight of the component (A).
6. The composition of claim 1, in which the amount of the component (C) is from 0.5 to 10 parts by weight per 100 parts by weight of the component (A).
7. The composition of claim 1, in which the component (B) is dicumyl peroxide, 2,5-dimethyl-2,5-di(t-butylperoxy)hexane, di-t-butyl peroxide or t-butylcumyl peroxide.
8. The composition of claim 1, in which the component (C) is diethylamine, triethylamine, triethylenediamine, N,N-dimethylparatoluidine, N,N,N',N'-tetramethylpropylenediamine or orthobenzenesulfimide.
9. The composition of claim 1, in which the proportion of the siloxane unit of formula (I) to the total siloxane units in the component (A) is from 30 to 100 mol %.
10. The composition of claim 1, in which the proportion of the siloxane unit of formula (I) to the total siloxane units in the component (A) is from 40 to 60 mol %.
11. The composition of claim 1 in which $R^3$ is a methyl group or a phenyl group.
12. The composition of claim 11 in which $R^4$ is a methyl group or a phenyl group.

* * * * *